United States Patent

Mashunkashey et al.

[11] Patent Number: 5,714,219
[45] Date of Patent: Feb. 3, 1998

[54] SUPPORT MEMBER FORMED OF RECYCLED MATERIAL AND PROCESS OF MANUFACTURE

[75] Inventors: Joe Ben Mashunkashey; Frederick W. Parker, both of Ardmore, Okla.

[73] Assignee: Soft Stone Corporation, Tex.

[21] Appl. No.: 669,887

[22] Filed: Jun. 20, 1996

Related U.S. Application Data

[63] Continuation-in-part of Ser. No. 531,776, Sep. 21, 1995, abandoned.

[51] Int. Cl.⁶ .................................................. B32B 9/00
[52] U.S. Cl. .................... 428/36.1; 428/218; 428/292; 428/317.1; 428/323; 428/327; 428/332; 428/403; 428/903.3; 156/61; 156/94; 156/95; 264/37; 264/40.5; 264/109; 264/115; 106/245; 106/724
[58] Field of Search .................... 428/218, 292, 428/317.1, 903.3, 36.1, 323, 327, 332, 425.5, 403, 908.8; 156/95, 61, 94; 264/37, 109, 349, 115, 40.5; 106/724, 245

[56] References Cited

U.S. PATENT DOCUMENTS

| | | |
|---|---|---|
| 3,801,421 | 4/1974 | Allen et al. |
| 4,028,288 | 6/1977 | Turner |
| 4,256,503 | 3/1981 | Tsuda et al. |
| 5,094,905 | 3/1992 | Murray |
| 5,221,702 | 6/1993 | Richards |
| 5,226,373 | 7/1993 | Esch |
| 5,238,734 | 8/1993 | Murray |
| 5,246,754 | 9/1993 | Miller |
| 5,258,222 | 11/1993 | Crivelli |
| 5,284,326 | 2/1994 | Chiovitti |
| 5,294,273 | 3/1994 | Tripp |
| 5,312,573 | 5/1994 | Rosenbaum |
| 5,316,708 | 5/1994 | Drews |
| 5,316,815 | 5/1994 | Tripp |
| 5,322,792 | 6/1994 | Peguy |
| 5,329,864 | 7/1994 | Doring |
| 5,396,731 | 3/1995 | Bryne |
| 5,397,825 | 3/1995 | Segrest |
| 5,456,751 | 10/1995 | Zandi et al. |

*Primary Examiner*—Patrick Ryan
*Assistant Examiner*—Abraham Bahta
*Attorney, Agent, or Firm*—Arthur F Zobal

[57] ABSTRACT

A resilient support member is provided for supporting a sidewalk, road surface, etc. The support member is formed of tire particles and a polyurethane binder. The tire particles have a size such that 100% of the particles will pass through a three inch sieve and about 95% of the particles will be retained on a half-inch sieve. The tire particles form about 80% to 95% by weight of the support member and the polyurethane forms about 5% to 20% by weight of the support member.

15 Claims, 4 Drawing Sheets

SUPPORT MEMBER FORMED OF RECYCLED MATERIAL AND PROCESS OF MANUFACTURE

SPECIFICATION

This application is a continuation-in-part of U.S. patent application Ser. No. 08/531,776, filed Sep. 21, 1995, now abandoned.

BACKGROUND OF THE INVENTION

1. Field of the Invention

The invention relates to walk way or road formed of recycled material.

2. Description of the Prior Art

Crumb rubber tire particles obtained from shredded automobile or truck tires have been bonded together to form surfaces such as walking or running pathways, etc. By crumb rubber is meant particles all of which will pass a ¼ inch sieve. Shredding tires to such small particles however, is very expensive and the use of crumb rubber is limited due to the expense.

SUMMARY OF THE INVENTION

It is an object of the invention to provide a support member and process of manufacture wherein the support member is formed of tire particles and a polyurethane binder wherein the tire particles have a size such that substantially 100% of the particles will pass through a three inch sieve and about 95% of the particles will be retained on a half-inch sieve.

In the preferred embodiment, the tire particles comprise about 80% to 95% by weight of the support member and the polyurethane comprises about 5% to 20% by weight of the support member.

Preferably the support member will be used as a base for a walk way or road for supporting an upper surface such as asphalt, concrete, etc.

In a further aspect polypropylene fibers may be used as well as a urethane catalyst.

DESCRIPTION OF THE PREFERRED EMBODIMENT

Figure 1:
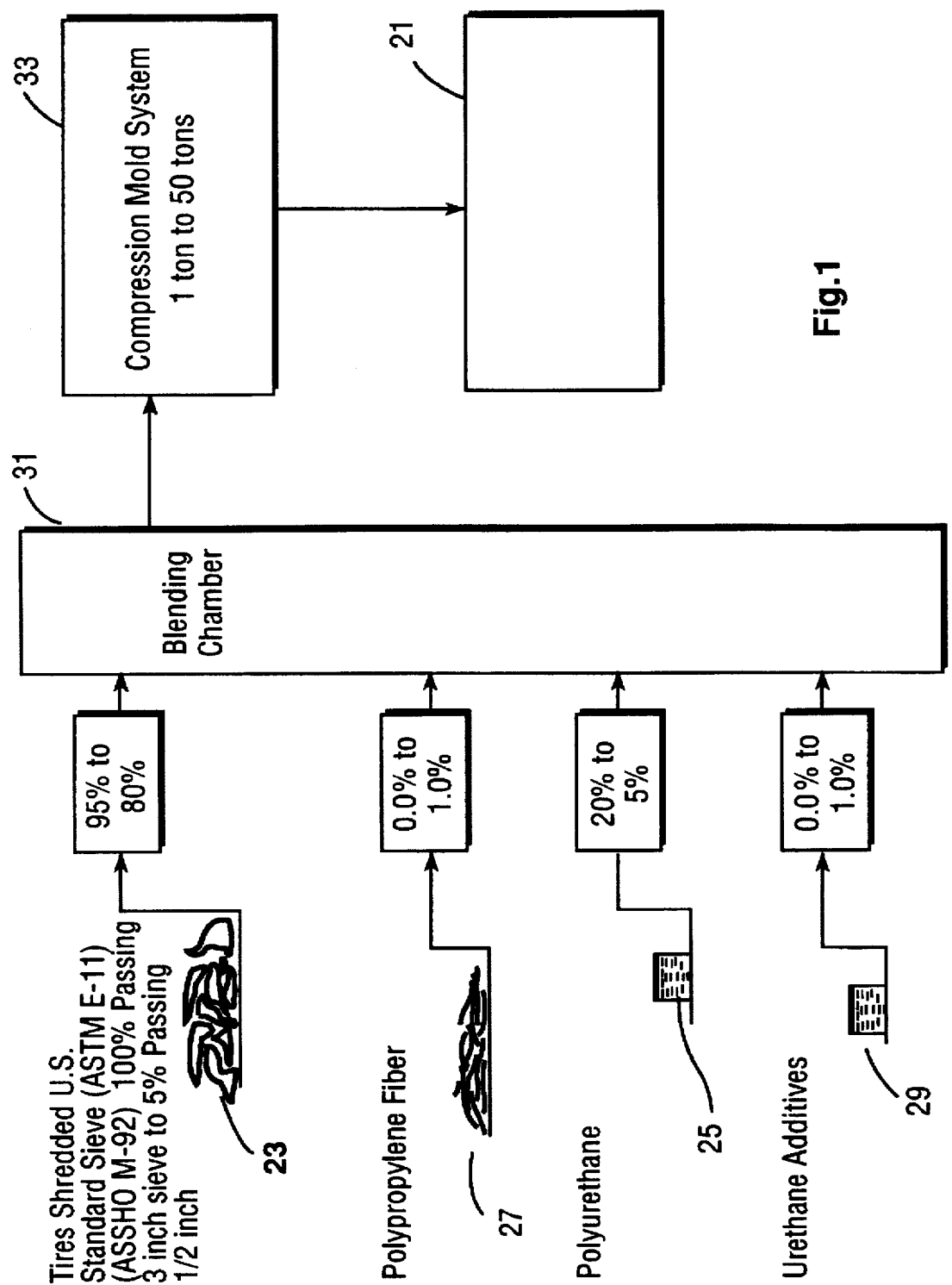
FIG. 1 is a block diagram of the process of forming the support member of the invention.
Figure 2:
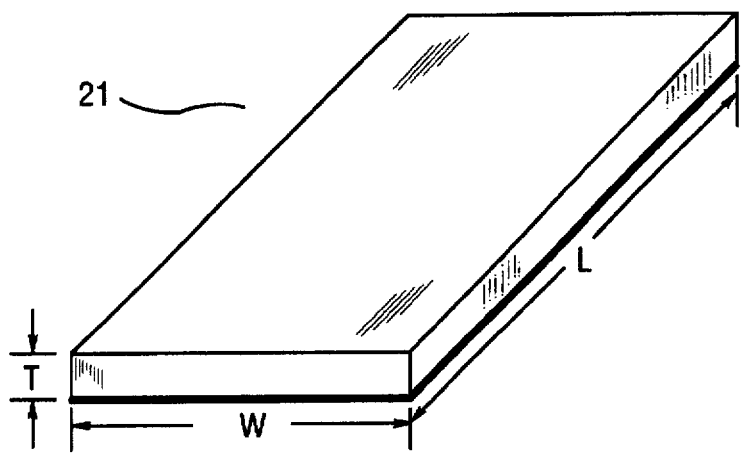
FIG. 2 is an isometric view of the support member of the invention.
Figure 3:
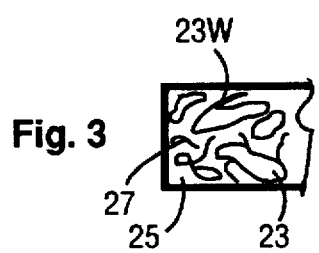
FIG. 3 is a partial cross-section of the support member showing its components.

Referring now to FIGS. 1, 2, and 3, the support member of the invention is identified by reference numeral 21. It has three dimensions, a width W, a thickness T, and a length L. The support member is a resilient member formed of shredded tire particles 23 and polyurethane 25 used to bind the tire particles together. Polypropylene fibers 27 may be used to help strengthen the matric. In addition a urethane catalyst 29 may be used to speed up the curing process.

In the process of forming the member 21, and assuming all four components are used, the tire particles 27, polypropylene fibers 29, polyurethane 30, and urethane catalyst 29 are fed to a blending chamber 31 where the four components are thoroughly mixed. The mixture is fed to a compression mold 33 to form the final product 21.

A commercially available system can be used for the blending chamber 31. The compression mold system 33 may apply 1–50 tons of pressure to the mixture as the polypropylene cures. A commercially available system can be used for the compression mold system.

The tire particles used have a size such that 100% will pass a three inch sieve and 95% will be retained on a ½ inch sieve. A tire defined by Funk and Wagnalls Standard Desk Dictionary as a composition formed of approximately 27% synthetic rubber, 28% carbon black, 3% other petrochemicals, 10% extender oil, 4% organic fabric (nylon/pet) 10% steel wire, 3% others (S,ZnO,T1O2 m etc.), 14% natural rubber. Most of the synthetic rubber is made from the monomers, styrene and butadiene rubber which are abundant in petroleum. Thus most of the automobile and track tires in the U.S.A. tires include the synthetic rubber styrene-butadiene rubber (SBR). The tire particles used to make the member 21 comprises from 80% to 95% by weight of the member.

The polyurethane used as a binder is used in amount of about 5% to 20% by weight of the member 21. It is added as a liquid to the chamber 31 at room temperature. Its curing time is about 24 hours however the curing time may be decreased to 4–6 hours by adding a liquid urethane catalyst in the amount of up to 1% by weight of the mixture applied to the blending chamber 31. Polypropylene fibers may be added to increase the strength of the matrix 21. The amount of polypropylene fibers added may be up to 1% by weight of the member 21.

Detailed descriptions of the polypropylene fibers, polyurethane and urethane catalyst used in the process are set forth in the following tables I, II, and III.

TABLE I

Polypropylene: a man-made fiber in which the fiber-forming substance is a long-chain synthetic polymer composed of at least 85% by weight of ethylene propylene or other olefin units.

| Physical Properties: | Value: | Test Procedure: |
| --- | --- | --- |
| Materials: | Polypropylene | |
| Denier: | .00098 + .0001" (4 + 1) | ASTM D-1577* |
| Length: | 10 + −2 mm | |
| Crimps: | None | ASTM D-3987-82 |
| Tensile Strength: | 40,000 psi. min. | ASTM D-822-83* |
| Elongation: | 30% minimum | ASTM D-2256-80* |
| Specific Gravity: | 0.91 | |
| Alkali Resistance: | 99% strength retained | 40% NaOh Solution at 70 deg. F. for 1000 hrs. |
| Acid Resistance: | 99% strength retained | 95% HCL solution at 70 deg. F. for 1000 hrs. |
| Moisture Regain at 70 deg. F. & 65% Relative Humidity: | Less than 0.1% | ASTM D-2654-76 |
| Shrinkage: | 0% at 300 degrees | C.T.L. temperature resistance test |

*This data must be obtained prior to cutting the fiber.

TABLE II

Polyurethane: a man-made urethane modified with a synthetic polymer. The urethane used is a single-package, moisture-cured methylene diphenyl diisocyante prepolymer.
Reaction of a Single-Package Urethane with Moisture
R = Aromatic or Aliphatic Group

Isocyanate + Water > Carbanic Acid (Unstable) > Amine + Carbon Dioxide

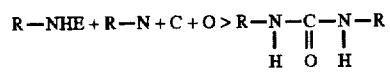

Amine + Isocyanate > Urea Derivative

TABLE III

Urethane Additives (Catalyst):

Typical Properties:

| | |
|---|---|
| Specific Gravity (25 deg. C.) | 1.09 |
| Freezing Point | −5 deg. C. |
| Viscosity, Brookfield (25 deg. C.) | 18,000 cs. or 20,000 cps. |
| Flash Point (TCC) | 102 deg. C |
| Solubility | Soluble in water and polar solvents especially alcohols and glycols |
| Potassium Content | 14.0% |
| Physical State (25 deg. C.) | Viscous Liquid |
| Color | Pale Yellow |
| Coefficient of Expansion | 3.38 × 104 |
| Number (calculated) 86 | |

The shredded tires particles are commercially available from a number of companies in the U.S.A. The U.S. Government has required tires to be shredded and currently the shredded tire particles are available in relatively large particle sizes such that 100% will pass a 3 inch sieve and 95% will be retained on a ½ inch sieve. These tire particles have been ground to crumb-sizes and bonded together to make pathways however the grinding cost is very high and there has been essentially no market for the stockpiled shredded tire particles particularly since much of the tire particles contain steel wire.

The present invention is directed to an inexpensive product made from the stock piled tire particles and the process of manufacture.

A shown in FIG. 2 the member 21 has a width W, a thickness T, and a length L. W may vary from 2 feet to 12 feet; T may vary from 2 inches to 12 inches; and L may vary from 2 feet to 80 feet.

Figure 4:
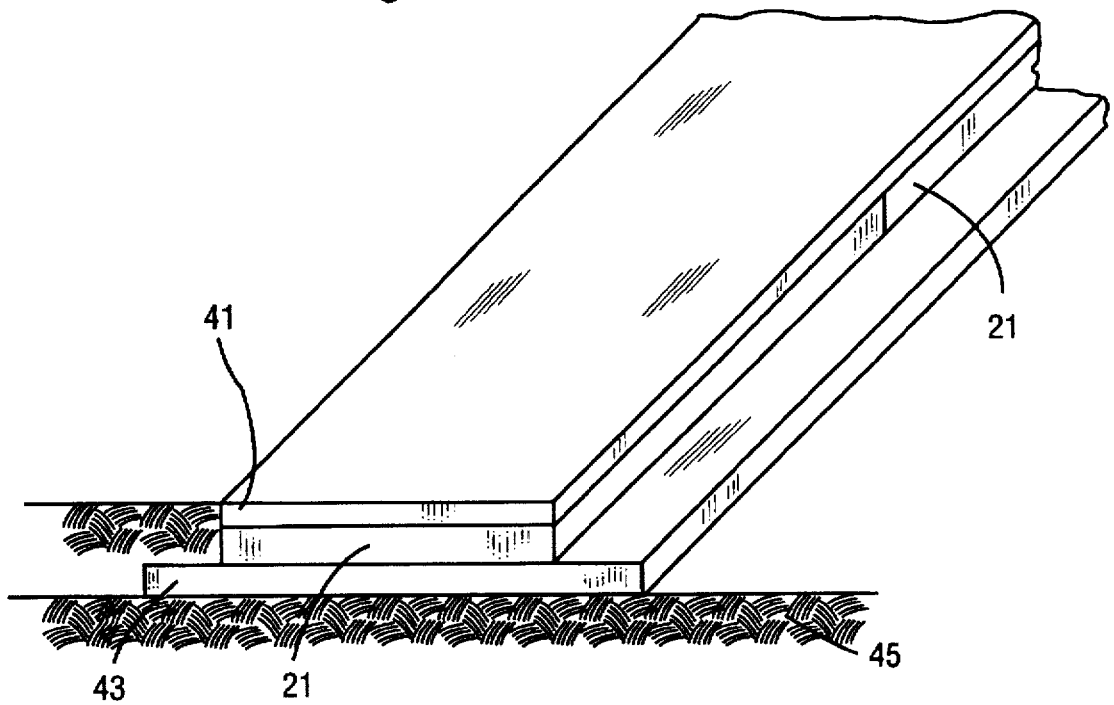
FIG. 4 illustrates the support member used to support a walking surface.

In the embodiment of FIG. 4, the members 21 are used to support a walking surface 41 for persons and which surface 41 may be concrete, asphalt, crushed rock, etc. The members 21 are laid on a base 43 formed in the ground 45 and which base 43 may be gravel etc. The adjacent ends of the support members 21 are tied together or bonded together with epoxy etc. Although not shown in FIG. 4, the dirt will be filled in on the right side as shown on the left side. In this embodiment, T may be equal to 3–6 inches and W may be equal to 2–12 feet. The members 21 provide a resilient support for the surface 41. Since there is no direct contact by persons with the members 21, the presence of the steel wire particles 23W (See FIG. 3) will have no effect on the persons using the walkway 41.

Figure 5:
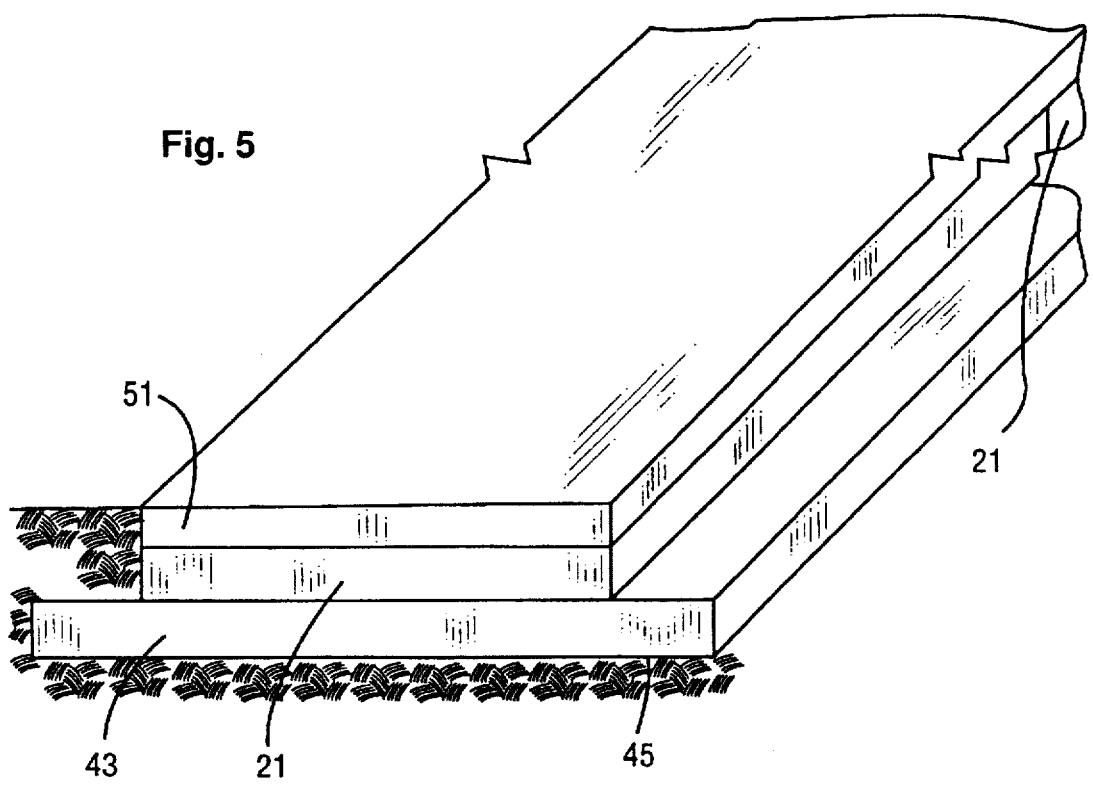
FIG. 5 illustrates the support member used to support a roadway.

In the embodiment of FIG. 5, the support members 21 are used to support a road surface 51 for automobiles, trucks, etc. and which surface may be concrete, asphalt, etc. The members 21 are laid on a base 43 formed of ground 45 and which base 43 may be gravel, etc. The adjacent ends of the support members 21 are tied together or bonded together with epoxy, etc. Although not shown in FIG. 5, the dirt will be filled in on the right side a shown on the left side. In this embodiment, T may be equal to 4–12 inches and W may be equal to 4–12 feet. The members 21 provide a resilient support for the surface 51. Since there is no direct contact by the tires of the motor vehicles with the member 21, the presence of the steel wire particles 23W (See FIG. 3) will not effect the motor vehicles using the road 51.

Figure 6:
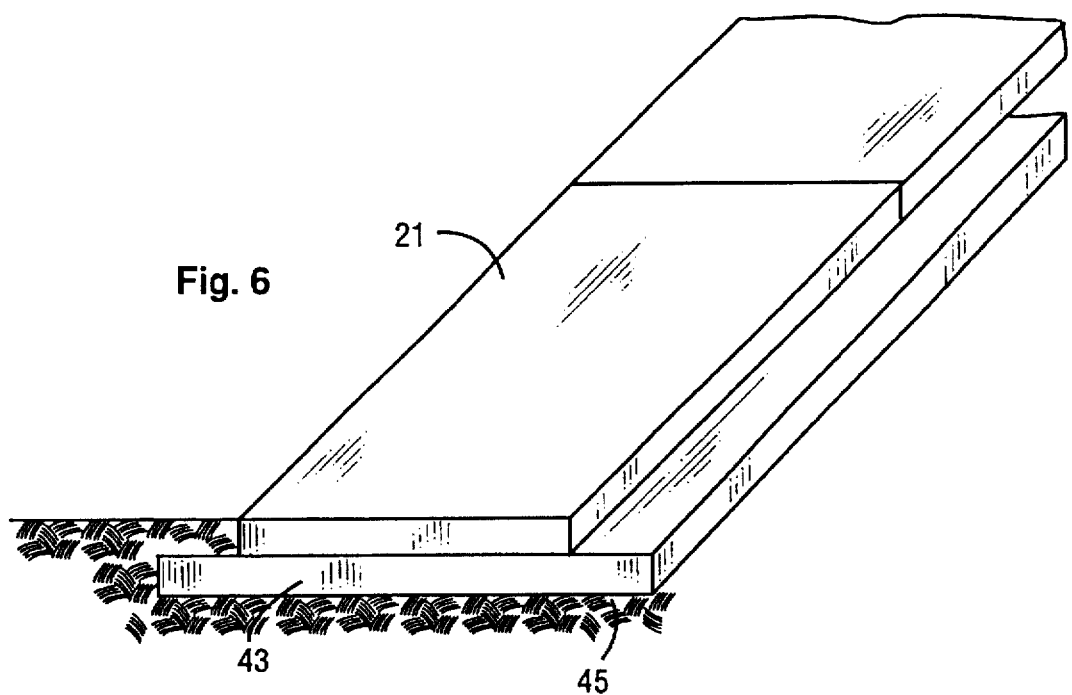
FIG. 6 illustrates the support member used as a walking surface.

In the embodiment of FIG. 6, the members 21 are used as the walking surface for persons. The members 21 are laid on a base 43 formed in the ground 45 and which base 43 may be gravel, etc. The adjacent ends of the support members 21 are tied together or bonded together with epoxy, etc. Although not shown in FIG. 6, the dirt will be filled in on the right side as shown on the left side. In this embodiment T and W may be the same as that of the embodiment of FIG. 4. In this embodiment, tire particles which have no steel wire particles will be used to form the member 21.

The support member of the invention also may be used to support concrete floors of buildings, etc.

In another embodiment, the member 21 formed comprises about 90–95% by weight of the tire particles; about 5% by weight of polyurethane and about 3–5% by weight of fluff. By fluff is meant nylon cord and other types of non-metallic fibers that are by-products of the tire shredding and cramming process. The fluff is used to help bond the particles together. In forming the member 21, the tire particles, polyurethane and water plus a surfactant are mixed together. The surfactant may be a citrus detergent. The tire particles may include the severed wire or fiber cords pieces embedded or attached thereto and which wire or fiber cord was used in forming the tires. The size of the tire particles are such that substantially 100% of the particles will pass through a three inch sieve and about 95% of the particles will be retained on a one-half inch sieve. The water and surfactant are heated to about 130°–145° F. The water/surfactant mixture comprises about 7.7% by weight of water and about 0.3% by weight of surfactant. The water evaporates and helps the cross linking process accelerate. It acts as a catalyst. The surfactant breaks the surface tension of the water molecules so it will disperse in the mix quicker. It hastens the curing process.

The mixing or blending process is carried out in the blender 33 for about 45 seconds. If the mixing time is too long the polypropylene and fluff tend to ball up. The tire particles and water-surfactant are added to the mixer and blended. The polyurethane is added and mixing is carried out for about 30 seconds. Next the polypropylene fibers and fluff are added and mixing is carried out for about 15 seconds. It has been found that this sequence of mixing is important in order to develop a homogenous mix.

The mixture then is placed in the compression mold system and pressure applied at about 50 to 180 pounds per square inch for about 4 hours.

Figure 7:
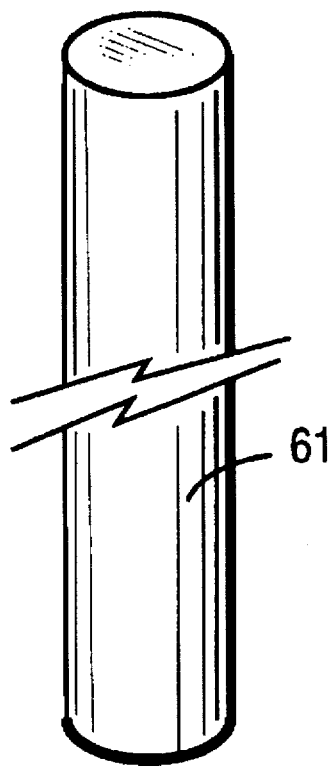
FIG. 7 illustrates a post of the invention.

Instead of the rectangular member 21, the mold system may be configured to mold cylindrical posts 51 as shown in FIG. 7 for use as rail supports for highway purposes. The posts 61 may be 7–8 inches in diameter and 5–8 feet long.

It has been found that the members 21 and posts 61 produced by this process are resilient and porous to water. The products obey Hooks law regarding stress-strain and the elastic behavior can be predicted accurately which is important for design engineers. At normal atmospheric pressure, it has been found the water will pass through the products 21 and 61.

The member 21 may be used as a support roadway or pathway support or as sound absorbent wall.

Figure 8:
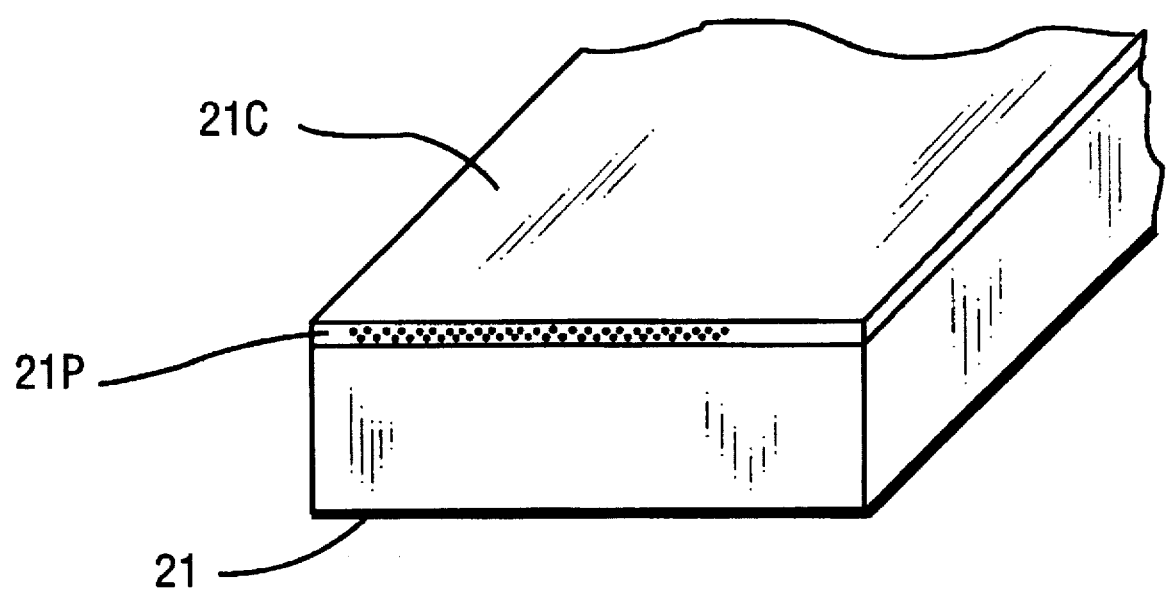
FIG. 8 is a portion of a two layered support member.

As a roadway or pathway support member, a crum rubber layer 21C any be applied to the top surface as shown in FIG. 8. Crum rubber is generally defined as tire particles having a size less than ¼ of an inch. They contain no metal or fiber cord pieces. The crum rubber particles 21P may be mixed with polyurethane and applied on the entire top of the mixture of the larger tire particles, polyurethane, etc. in the mold to form the layer 21C on top of the member 21 in a single molding process. The layer 21C may be ¼ to ¾ of an inch thick. The layer 21C seals the top of the member 21 against water and provides protection against the wire particles when one walks on the support member.

If the member 21 is used as a sound absorbent wall, laytex paint may be sprayed on the surfaces of the member 21 to provide protection against water and to provide a more uniform outer texture.

For purposes of this application, a ¼ inch sieve defines a sieve having square openings of ¼ of an inch on each side thereof and a ½ inch sieve defines a sieve having square openings of ½ of an inch on each side thereof.

We claim:

1. A three dimensional member comprising:

shredded tire particles having a size such that substantially 100% of said particles will pass through a three inch sieve and about 95% of said particles will be retained on a half inch sieve, and polyurethane attached to said tire particles to hold said tire particles together.

2. The member of claim 1, wherein:

said tire particles comprise about 80% to 95% by weight of said member and said polyurethane comprises about 5% to 20% by weight of said member.

3. The member of claim 2, wherein:

said member comprises polypropylene fibers mixed with said tire particles and said polyurethane in an amount such that said polypropylene fibers comprise not more than about 1% by weight of said member.

4. A process of forming a three dimensional support member to be located on a surface, said support member having a width, a length, and a thickness, said process comprising the steps of:

mixing shredded tire particles and polyurethane together to allow said polyurethane to attach to said tire particles to hold said tire particles together, said tire particles having a size such that substantially 100% of said tire particles will pass through a three inch sieve and about 95% of said tire particles will be retained on a one-half inch sieve, and molding said tire particles and polyurethane to form said three dimensional support member.

5. The process of claim 4, wherein:

said tire particles comprise about 80% to 95% by weight of said support member formed and said polyurethane comprises about 5% to 20% by weight of said support member formed.

6. The process of claim 5, wherein:

polypropylene fibers are mixed with said tire particles and said polyurethane in an amount such that said polypropylene fibers comprise not more than about 1% by weight of said support member formed.

7. The process of claim 5, wherein:

a urethane catalyst is mixed with said tire particles and said polyurethane.

8. Support structure comprising:

a three dimensional support member located on a surface, and load bearing structure locate on said support member, said support member comprising:

shredded tire particles having a size such that substantially 100% of said particles will pass through a three inch sieve and about 95% of said particles will be retained on a half inch sieve, and polyurethane attached to said tire particles to hold said tire particles together.

9. The support structure of claim 8, wherein:

said tire particles comprise about 80% to 95% by weight of said support member and said polyurethane comprises about 5% to 20% by weight of support said member.

10. The support structure of claim 8, wherein:

said tire particles comprise synthetic rubber and metal particles.

11. The support structure of claim 9, wherein:

said tire particles comprise synthetic rubber and metal particles.

12. The member of claim 2, wherein:

said member comprises an upper surface, on upper layer bonded to said upper surface, said upper layer comprises smaller tire particles with polyurethane bonding said smaller tire particles together and to said upper surface of said member, said smaller tire particles have a size such that substantially all of said smaller tire particles will pass through a ¼ inch sieve.

13. The support member of claim 9, wherein:

said support member comprises an upper surface, on upper layer bonded to said upper surface, said upper layer comprises smaller tire particles with polyurethane bonding said smaller tire particles together and to said upper surface of said support member, said smaller tire particles have a size such that substantially all of said smaller tire particles will pass through a ¼ inch sieve.

14. A process of forming a three dimensional member to be located on a surface, said member having a width, a length, and a thickness, said process comprising the steps of:

mixing shredded tire particles and polyurethane together for a given time period and then mixing non-metallic fibers with said tire particles and said polyurethane for a time period shorter than said given time period to allow said polyurethane to attach to said tire particles to hold said tire particles together, said tire particles having a size such that substantially 100% of said tire particles will pass through a three inch sieve and about 95% of said tire particles will be retained on a one-half inch sieve, and molding said tire particles and polyurethane under pressure to form said three dimensional member.

15. The process of claim 14, wherein:

said tire particles comprise about 80% to 95% by weight of said support member formed and said polyurethane comprises about 5% to 20% by weight of said support member formed.

* * * * *